(12) United States Patent
Cheng

(10) Patent No.: US 6,429,749 B1
(45) Date of Patent: Aug. 6, 2002

(54) CANCELLATION CIRCUIT THAT SUPPRESSES ELECTROMAGNETIC INTERFERENCE IN A HIGH SPEED CIRCUIT

(75) Inventor: Yu-Chiang Cheng, Taipei (TW)

(73) Assignee: Mitac International Corp., Hsin-Chu Hsien (TW)

( * ) Notice: Subject to any disclaimer, the term of this patent is extended or adjusted under 35 U.S.C. 154(b) by 2 days.

(21) Appl. No.: 09/708,013

(22) Filed: Nov. 8, 2000

(30) Foreign Application Priority Data

Nov. 30, 1999 (TW) .......................................... 88120832

(51) Int. Cl.[7] .................................................. H04B 3/28
(52) U.S. Cl. ............................................. 333/12; 333/1
(58) Field of Search ........................................ 333/12, 1

(56) References Cited

U.S. PATENT DOCUMENTS

| 3,518,577 | A | * | 6/1970 | Baum | 333/12 |
| 5,047,736 | A | * | 9/1991 | Ghose | 333/12 |
| 5,729,183 | A | * | 3/1998 | Schuchmann et al. | 333/1 |
| 6,184,736 | B1 | * | 2/2001 | Wissell et al. | 333/1 X |

* cited by examiner

Primary Examiner—Justin P. Bettendorf
(74) Attorney, Agent, or Firm—Rabin & Berdo, P.C.

(57) ABSTRACT

The invention is a cancellation circuit that suppresses electromagnetic interference in a high speed circuit, which achieves the objects of canceling the magnetic field and coupling the electric field through a differential signal under the premise of not affecting the signal quality. The differential signal is generated from the original high speed circuit using a phase shifter. Suitable phase shifters include a same-layer type, a meander type and a different-layer stacking type.

16 Claims, 3 Drawing Sheets

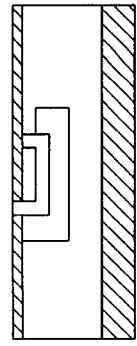
Fig. 3A PRIOR ART
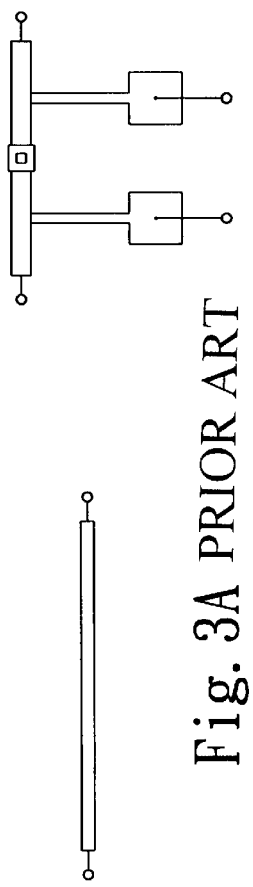
PRIOR ART Fig. 3D
Fig. 3B PRIOR ART
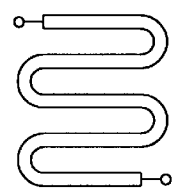
Fig. 3C PRIOR ART
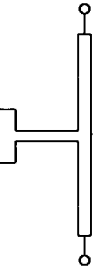
Fig. 3G PRIOR ART
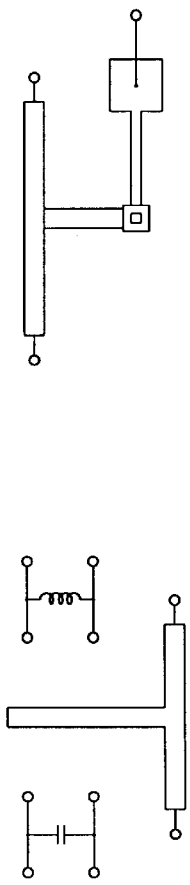
Fig. 3E PRIOR ART
Fig. 3F PRIOR ART
Fig. 3H PRIOR ART

CANCELLATION CIRCUIT THAT SUPPRESSES ELECTROMAGNETIC INTERFERENCE IN A HIGH SPEED CIRCUIT

BACKGROUND OF THE INVENTION

1. Field of Invention

The present invention relates to a cancellation circuit that suppresses electromagnetic interference in a high speed circuit and, in particular, to a cancellation circuit that cancels the magnetic field.

2. Related Art

To increase the electromagnetic compatibility (EMC) of electronic products, one has to take account of the circuits of the power, signal lines, analogue signals, digital signals, electronic box and operational box when designing the products. One crucial thing is the filter circuit, including the decoupling capacitor, the filter capacitor, the bypass capacitor, etc. Since the clock rate on the PC board is increasing (from 33 MHz to 133 MHz), normal filters imposed on signals (including RC filters and LC filters) cannot achieve the object of canceling electromagnetic interference in a high speed circuit under the consideration of the possibility of affecting the signal quality.

In observation of the fact that the above-mentioned filters will serious affect the signal quality of a high speed circuit, it is a feasible way to use differential signals to cancel electromagnetic interference in a high speed circuit. However, most current high speed circuit signals are single-ended signals, so their electromagnetic interference cannot cancel with that of the differential signals.

SUMMARY OF THE INVENTION

The cancellation circuit disclosed herein to suppress the electromagnetic interference of a high speed circuit invokes another circuit by the high speed circuit to generate differential signals for canceling the magnetic field and coupling to the electric field. The differential signal is generated by a dummy signal that passes through a phase shifter, thus having the differential effects.

The additional circuit provided by the invention includes a same-layer type, a meander type and a different-layer stacking type.

BRIEF DESCRIPTION OF THE DRAWINGS

The present invention will become more fully understood from the detailed description given hereinbelow illustration only, and thus are not limitative of the present invention, and wherein:

FIGS. 3a through 3h show conventional phase shifters.

DETAILED DESCRIPTION OF THE INVENTION

Figure 1:
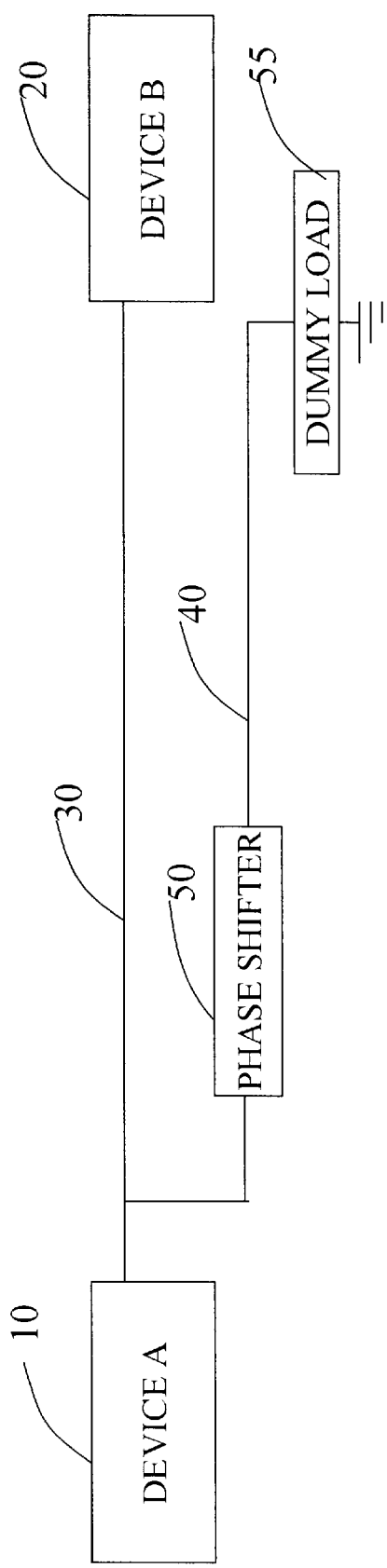
FIG. 1 is a composite circuit diagram of an embodiment according to the invention.
Figure 1A:
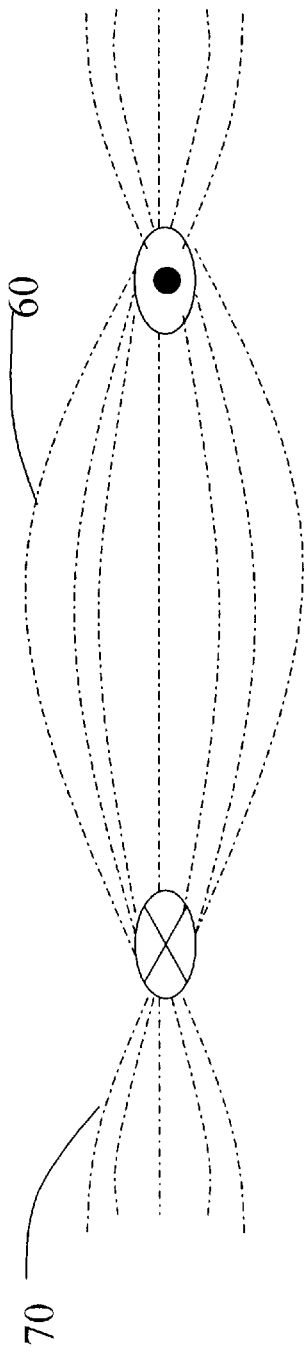
FIG. 1A is a schematic view of the electromagnetic field cancellation and stray fringing field strength of the composite circuit according to an embodiment of the invention.

The invention discloses a cancellation circuit that can suppress electromagnetic interference in a high speed circuit. The cancellation circuit is another circuit by the original high speed circuit. It first goes through a phase shifter so as to generate differential effects. FIG. 1 shows the composite circuit according to an embodiment of the invention. A device A (10) and a device B (20) are connected using a high speed signal wire 30. A wire 40 carries a signal that is shifted by a phase shifter 50 and is connected to a dummy load 55 which is grounded. The dummy load 55 can be an assembly of passive devices such as resistors or capacitors. The wire 30 and the wire 40 are close to each other, generating a phase difference to cancel the electromagnetic field. The phase difference ranges from 90° to 180°, depending upon the circuit design of the phase shifter 50. Under the premise of not sacrificing the signal quality, this differential signal can cancel the magnetic field and couples to the electric field according to the Ampere's Law (FIG. IA). In the drawing, the oval with the "X" means the current direction (into the paper) of the wire 30 and the oval with the dot is the current direction (out of the paper) of the wire 40. Therefore, in the near field, most of the electromagnetic field 60 is cancelled. There is only very little stray fringing field 70 traveling into plane waves in the far field. This greatly reduces electromagnetic radiation.

Figure 2:
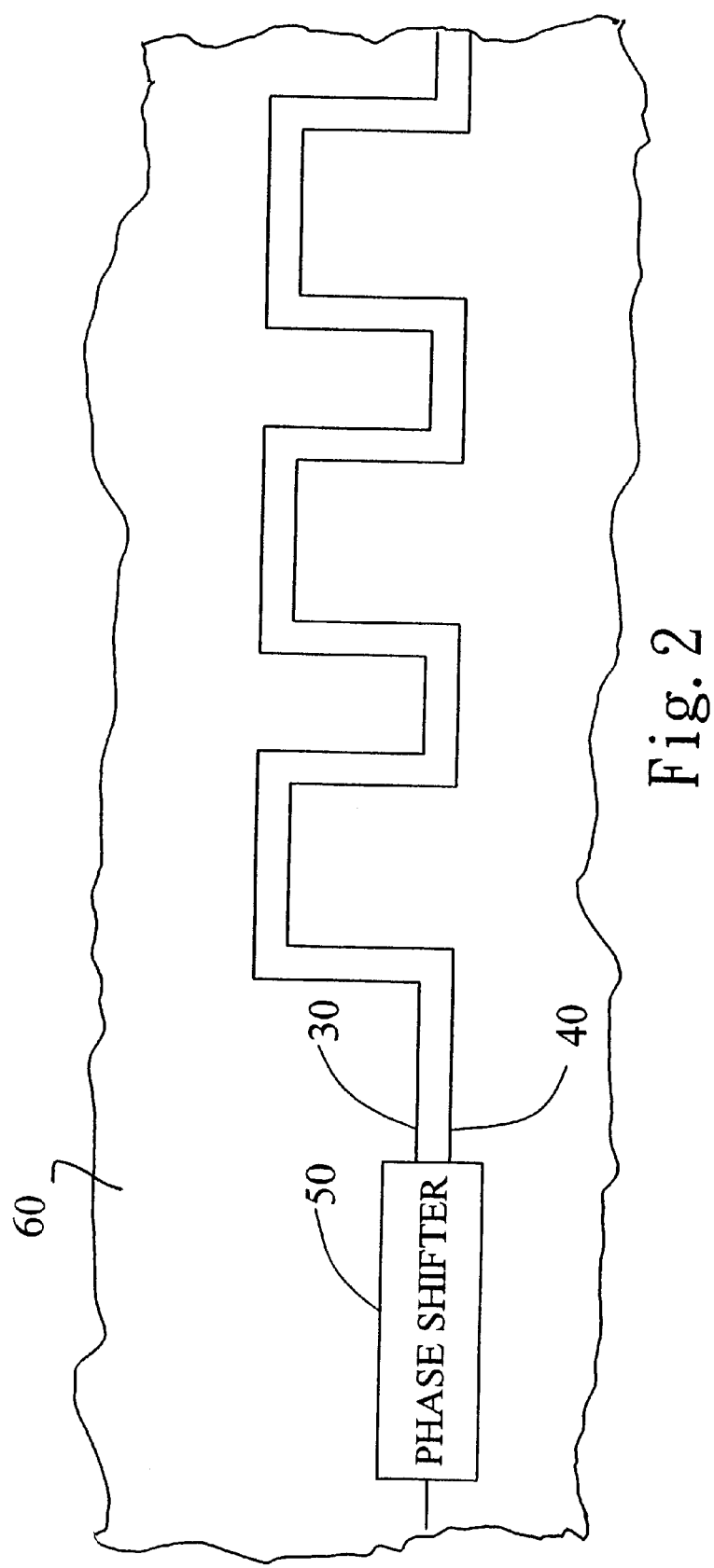
FIG. 2 is a composite circuit diagram according to a preferred embodiment of the invention.

To enhance the cancellation effect, a preferred wiring method is employed on a PCB 60, a broken-away portion of which is shown in FIG. 2, which illustrates a composite circuit diagram according to a preferred embodiment of the invention. The wiring is of a meandering type to provide a better cancellation effect. Aside from conductor pairs formed on the same layer of the PCB, there is also a type of wiring formed on upper and lower layers, which can also cancel the electromagnetic field (not shown).

The phase shifter employed in the present invention can be selected from one of the conventional phase shifters shown in FIGS. 3a to 3h. FIG. 3a depicts a straight delay line type, FIG. 3B is a meander-line delay line type, FIG. 3c is a T-junction phase type, FIG. 3d is a series phase type, FIG. 3e is a series PIN diode phase type, FIG. 3f is a shunt phase type, FIG. 3g is a shunt PIN diode phase type and FIG. 3h is a ferroelectric phase type.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An interference cancellation circuit for use with a first device and a second device that are connected by a first conductor, the first device supplying a signal to the second device via the first conductor, said cancellation circuit comprising:

a phase shifter to shift the phase of the signal supplied by the first device so as to produce a phase-shifted signal, the phase shifter being disposed closer to the first device than to the second device;

a dummy load disposed adjacent the second device; and a second conductor to convey the phase-shifted signal from the phase shifter to the dummy load.

2. The cancellation circuit of claim 1, wherein the phase shifter is a straight delay line.

3. The cancellation circuit of claim 1, wherein the phase shifter is a meander-line delay line.

4. The cancellation circuit of claim 1, wherein the phase shifter is a T-junction phase shifter.

5. The cancellation circuit of claim 1, wherein the phase shifter is a series phase shifter.

6. The cancellation circuit of claim 1, wherein the phase shifter is a series PIN diode phase shifter.

7. The cancellation circuit of claim 1, wherein the phase shifter is a shunt phase shifter.

8. The cancellation circuit of claim 1, wherein the phase shifter is a shunt PIN diode phase shifter.

9. The cancellation circuit of claim 1, wherein the phase shifter is a ferroelectric phase shifter.

10. The cancellation circuit of claim 1, wherein the first and second conductors are selected from the group consisting of same-layer conductors, meandering conductors, and the different-layer stacked conductors.

11. The cancellation circuit of claim 1, wherein at least a portion of the first conductor and at least a portion of the second conductor are provided on a printed circuit board.

12. The cancellation circuit of claim 11, wherein the printed circuit board has a top surface, wherein said at least a portion of the first conductor is disposed on the top surface of the printed circuit board, and wherein said at least a portion of the second conductor is also disposed on the top surface of the printed circuit board.

13. The cancellation circuit of claim 11, wherein said at least a portion of the first conductor follows a first path, and wherein said at least a portion of the second conductor follows a second path, the second path being disposed closely adjacent the first path.

14. The cancellation circuit of claim 13, wherein the first path is a meandering path, and wherein the second path is also a meandering path.

15. The cancellation circuit of claim 14, wherein the second path has a shape which conforms substantially to that of the first path.

16. The cancellation circuit of claim 1, wherein the first device is a single-ended high speed circuit.

* * * * *